United States Patent [19]
Inokuchi

[11] Patent Number: 5,414,688
[45] Date of Patent: May 9, 1995

[54] DISK REPLICATION APPARATUS

[76] Inventor: Tatsuya Inokuchi, c/o Sony Corporation 7-35, Kitashinagawa 6-chome, Shinagawa-ku, Tokyo, Japan

[21] Appl. No.: 128,878

[22] Filed: Sep. 29, 1993

[30] Foreign Application Priority Data

Sep. 30, 1992 [JP] Japan .................................. 4-285462

[51] Int. Cl.6 .............................................. G11B 7/00
[52] U.S. Cl. ........................................ 369/84; 369/48; 360/15
[58] Field of Search ...................... 369/83, 84, 85, 58, 369/48, 47; 360/13, 15

[56] References Cited

U.S. PATENT DOCUMENTS

| | | | |
|---|---|---|---|
| 4,758,902 | 7/1988 | Okamoto et al. | 360/15 X |
| 4,769,804 | 9/1988 | Satoh et al. | 369/58 |
| 5,072,435 | 12/1991 | Bakx | 369/48 |
| 5,212,678 | 5/1993 | Roth et al. | 369/60 |
| 5,311,492 | 5/1994 | Tabuchi et al. | 369/47 |

FOREIGN PATENT DOCUMENTS

| | | | |
|---|---|---|---|
| 0234709 | 9/1987 | European Pat. Off. | 369/85 |
| 0258834 | 9/1992 | Japan | 369/84 |

Primary Examiner—W. R. Young
Assistant Examiner—Thang V. Tran
Attorney, Agent, or Firm—Limbach & Limbach

[57] ABSTRACT

A disk replication apparatus is used when the stamper and the like of a compact disk is made from an original compact disk, and the apparatus permits the compact disk to be simply and securely made. A compact disk is replicated in such a manner that main data D1 continued in the format of audio data is recorded by using a reproduction subcode Q as reference wherein the main data D1 is recorded while keeping a lag between the subcode Q and frame data D1 by using the reproduction subcode Q as the reference, and further a read-in area is separately formed and then a predetermined pose section is formed so that the frame data D1 and the like are continued.

5 Claims, 12 Drawing Sheets

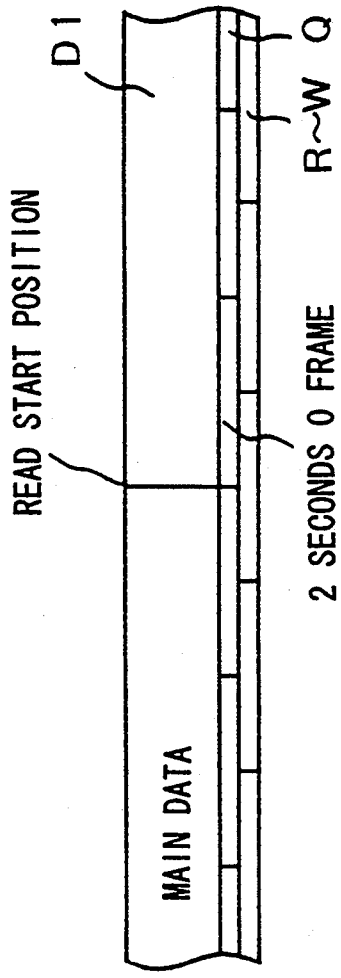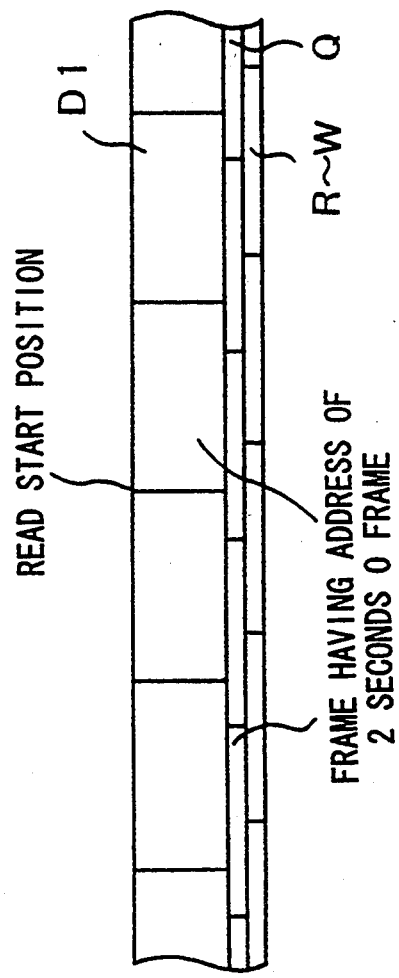
FIG. 9
FIG. 10

DISK REPLICATION APPARATUS

BACKGROUND OF THE INVENTION

1. Field of the Invention

This invention relates to a disk replication apparatus, and more particularly is applicable, for example, to the manufacture of a stamper of a compact disk.

2. Description of the Related Art

Conventionally, compact disks are manufactured in a large quantity by using a predetermined stamper which has been previously provided.

More specifically, as shown in FIG. 1, in a compact disk manufacturing process, first, audio data composed of a digital audio signal is input to an editing unit to edit the audio signal by the unit.

Further, in this compact disk manufacturing process, a data layout on the compact disk is determined based on the edited audio signal in a mastering process and recording data with the recording format of the compact disk is generated in accordance with the data layout.

Further, in the mastering process, the recording data is encoded to a CD (compact disk) signal and then a stamper is made by using the CD signal.

In the mastering process, an original master disk for manufacturing compact disks is made in such a manner that a glass substrate on which photoresistor is coated, for example, is irradiated with a laser beam modulated by the CD signal and developed, and in a succeeding stamper process, a stamper for manufacturing the compact disks is made from the master original disk.

With this arrangement, in the compact disk manufacturing process, compact disks are manufactured in a large quantity by using the stamper and applying a method such as, for example, injection molding.

Incidentally, some compact disks can record various data by using the recording format of audio data (that is, they are composed of a CD-ROM).

As shown in FIG. 2, the CD-ROM has three kind of modes, i.e., mode 0 to mode 2 and in each mode desired data are converted into frame data in accordance with a predetermined format and then the converted data are further converted into recording data in accordance with the audio format of a compact disk.

However, in the CD-ROM, two kinds of formats, i.e. a form 1 and a form 2 are given to the third mode, i.e. the mode 2 out of the three kinds of modes, which permits the selection of various formats in accordance with the user data to be recorded.

Here, as shown in FIG. 3, in the compact disk, a channel of a subcode Q can be demodulated by demodulating a reproduction signal S1 being an EFM modulation signal, which is obtained by reproducing the compact disk, at an EFM demodulation circuit 1, which permits to detect the address data of recorded data.

Further, in the compact disk, a channel of a subcode R-W can be reproduced by correcting the error of a signal output from the EFM demodulation circuit 1 at an error correction processing circuit 3, which permits to reproduce image data and the like recorded to the channel of the subcode R-W.

On the other hand, a channel of audio data AU can be reproduced in such a manner that a signal output from the EFM demodulation circuit 1 is input to an error correction circuit 4 to correct the error thereof by using cyclic code, and the audio data is converted into an analog signal to reproduce an audio signal.

When the data of a CD-ROM is also reproduced, the sync pattern is detected at a synchronization detection circuit 5 to cut out continuous frame data in a predetermined block unit and the frame data is sequentially descrambled by a descramble circuit 6 in each block unit.

With this arrangement, in the formats of mode 0 and the form 2 of the mode 2 of the CD-ROM, it is found that desired data can be recorded to a compact disk in such a manner that the desired data is divided into the predetermined block unit and subjected to a scramble processing and added with sync data to form frame data and continuous frame data is processed in the same way as audio data.

On the other hand, in the mode 1 and the form 1 of the mode 2 of the CD-ROM, data output from the descramble circuit 6 can be demodulated by further correcting the error of the data at an error correction circuit 7.

With this arrangement, in the mode 1 and the form 1 of the mode 2 of the CD-ROM, it is found that frame data can be generated in such a manner that desired data is divided into a predetermined block unit and added with an error correction code and then processed in the same way as the mode 2 of the CD-ROM, and the frame data can be recorded to a compact disk by processing it in the same way as audio data.

With arrangement, this type of CD-ROMs can provide computer software and the like in a large quantity by the mass-producing them by using a master disk.

Incidentally, a drawback arises in that although computer software and the like must be debugged by operating it in an actual system, this type of the CD-ROM cannot repeat a debugging process in a short time because a master disk must be made.

A method of overcoming this drawback is to make a CD-ROM by using a write once type optical disk.

More specifically, in the write once type optical disk, desired information can be recorded only once by irradiating a light beam in accordance with recording information.

Therefore, when the CD-ROM is made by using the write once type optical disk, a debugging processing can be repeated in a short time.

It is contemplated to be convenient to make the stamper of a CD-ROM by replicating the CD-ROM subjected to a debugging processing as it is.

However, as described above with respect to FIG. 1, in a conventional compact disk manufacturing process, after data is edited at an editing unit, then the data layout on a compact disk is determined in a mastering process and a data train is generated by the recording format of the compact disk in accordance with the data layout. As a result the optical disk having been debugged as described above cannot make a stamper unless it is returned to its original data format once, and, thus a problem arises in that time is needed to make the stamper.

Further, when the optical disk is retuned to its original data format once, a problem also arises in that the positional relationship of frame data and the channel of the subcode Q composed of the address data of the frame data is unavoidably changed to the CD-ROM as a replication source.

More specifically, in reproduction, this type of the CD-ROM sets a time until corresponding frame data is detected to a desired time after it detects a channel of a subcode Q by setting a positional relationship of the channel of the subcode Q so that it corresponds to the frame data. Therefore, when the positional relationship is changed in this CD-ROM, there is a possibility that the frame data cannot be correctly reproduced or a processing program for processing the frame data cannot correctly operate.

Further, when the optical disk is returned to its data format once, the management of data is time-consuming in a CD-ROM in which audio data, video data, frame data and the like mixedly exist.

Although it may be contemplated to generate a CD signal by output data output from the EFM demodulation circuit 1 as a method of solving this problem, there is a possibility in this case that CD-ROMs made by mass-production cannot correctly reproduce data due to the accumulation of errors caused in reproducing.

SUMMARY OF THE INVENTION

In view of the foregoing, an object of this invention is to provide a disk replication apparatus in which this kind of optical disk can be replicated simply and securely.

The foregoing object and other objects of the invention have been achieved by the provision of a disk replication apparatus which comprises a reproduction unit 12 for reproducing an original optical disk 11 and sequentially outputting reproduced data, a recording signal generation unit 13 for sequentially converting the reproduced data into the recording signal SCD of the optical disk, and a control unit 15 for controlling the reproduction unit 12 and the recording signal generation unit 13. The reproduction unit 12 includes a demodulation means 20 for outputting a reproduction subcode Q and main data D1 by EFM demodulating a reproduction signal S1 obtainable from the program region of the original optical disk 11 and an error correction means 22 for generating the reproduction data D1 by correcting the error of the main data D1. The recording signal generation unit 13 includes a subcode generation means 42 for generating a subcode Q in accordance with subcode generation data input through a predetermined input means by using the timing of the reproduction subcode Q as a reference. A correction code generation means 46 generates the error correction code of the reproduction data D1, and an EFM modulation means 44 synthesizes the reproduction data D1, the error correction code and the subcode Q and then EFM modulates the same to generate the recording signal SCD.

Further, in the present invention, there is provided a disk replication apparatus, which comprises a reproduction unit 12 for reproducing an original optical disk 11 and sequentially outputting reproduced data. A recording signal generation unit 13 for sequentially converting the reproduced data into a recording signal SCD and a control unit 15 for controlling the reproduction unit 12 and the recording signal generation unit 13. The original optical disk 11 is recorded with user data in accordance with an audio format in such a manner that the user data is subject to a scramble processing in a predetermined block unit and added with sync data to generate frame data and the frame data is sequentially added with an error correction data and a subcode and recorded. The reproduction unit 12 includes a demodulation means 20 for outputting a reproduction subcode Q, the frame data D1 and the error correction data by EFM demodulating a reproduction signal S1 obtainable from the program region of the original optical disk 11 and an error correction means 22 for generating the reproduction data D1 by correcting the error of the frame data D1 and sequentially outputs the user data in the format of audio data reproduced in the audio format by outputting the reproduction data in the format of the frame data. The recording signal generation means 13 includes a correction code generation means 46 for sequentially generating a correction code to the reproduction data D1 and an EFM modulation means 44 for synthesizing the reproduction data D1, the error correction code and the subcode Q and then EFM modulating the same to generate the recording signal SCD and sequentially generates in accordance with the audio format the recording signal SCD from the reproduction data D1 output from the reproduction unit 12 in the format of the frame data.

Further, in the present invention, the recording signal generation unit 13 records the reproduction data D1, the error correction code and the subcode Q to the object 12 to be replicated as a disk by driving the object 12 to be replicated as a disk under predetermined conditions and irradiating a laser beam modulated by the recording signal SCD to the object 12 to be replicated as a disk and forms a read-in area on the inner circumference side of the object 12 to be replicated as a disk in accordance with the conditions for driving the object 12 to be replicated as a disk, the read-in area having a predetermined length in the radial direction of the disk, and then starts to record the reproduction data D1, the error correction code and the subcode Q.

Further, in the present invention, the original optical disk 11 records audio data in addition to the frame data. The reproduction unit 12 previously detects whether reproduction data continuous to a read-in area is the frame data or the audio data with respect to the original optical disk 11. The recording signal generation unit 13 records the reproduction data D1, the error correction code and the subcode Q to the object 12 to be replicated as a disk by driving the object 12 to be replicated as a disk under predetermined conditions and irradiating a laser beam modulated by the recording signal SCD to the object 12 to be replicated as a disk and forms a read-in area on the inner circumference side of the object 12 to be replicated as a disk in accordance with the conditions for driving the object 12 to be replicated as a disk, the read-in area having a predetermined length in the radial direction of the disk, and then when the reproduction data D1 continuous to the read-in area is the audio data and the Q channel data of the reproduction subcode reaches a predetermined duplication start value, the recording signal generation unit 13 starts to record the reproduction data D1 the error correction code and the subcode Q. When the reproduction data D1 continuous to the read-in area is the frame data, the recording signal generation unit 13 starts to record the reproduction data D1, the error correction code and the subcode Q from the leading head of the frame data D1 corresponding to the replication start value, based on the detected result of the reproduction unit 12.

Further, in the present invention, when the reproduction data D1 continuous to the read-in area is the frame data, the reproduction unit 12 previously detects the timing of the frame data D1 corresponding to the Q channel data of reproduction subcode, and when the reproduction data D1 continuous to the read-in area is the frame data, the recording signal generation unit 13 forms the read-in area and then records in accordance the audio format the frame data D1 set to a predetermined value in accordance with the timing and succeedingly starts to record the reproduction data D1, the error correction code and the subcode Q.

A replicate of the original optical disk 11 can be made at a real time in such a manner that the reproduction subcode Q and main data D1 are sequentially reproduced with respect to the reproduction signal S1 obtained from the program region of the optical disk 11. The generated subcode Q, the reproduction data D1 and the error correction code of the reproduction data D1 are synthesized by the recording signal generation unit 13 by using the timing of the reproduction subcode Q as a reference to sequentially generate the recording signal SCD and the recording signal SCD is modulated by an optical beam.

At this time, when the user data converted into the frame data is recorded to the original in accordance with the audio format, the user data is sequentially reproduced in the format of the audio data reproduced by the audio format and the recording signal SCD is sequentially generated in accordance with the audio format, and thus a replicate of the optical disk to which the user data is recorded can be made at a real time.

At this time, the read-in area is formed on the inner circumference side of the object 12 to be replicated as a disk in accordance with conditions for driving the object 12 to be replicated as a disk, the read-in area having a predetermined length in the radial direction of the disk, and then the record of the reproduction data D1, error correction code and subcode Q is started, and thus a replicate can be made under desired conditions in accordance with the standard of a compact disk or a CD-ROM.

In the original optical disk 11 to which the frame data and audio data are recorded, it is detected that the reproduction data continuous the read-in area is the frame data or the audio data, and when the reproduction data D1 continuous to the read-in area is the audio data and the Q channel data of the reproduction subcode reaches the predetermined replication start value, the record of the reproduction data D1, error correction code and subcode Q is started, and when the reproduction data D1 continuous to the read-in area is the frame data, the record of the reproduction data D1, error correction code and subcode Q is started from the leading head of the frame data D1 corresponding to the replication start value, and thus a replicate exactly like the original can be made.

When the reproduction data D1 continuous to the read-in area is the frame data, the timing of the frame data D1 corresponding to the Q channel data Q of the reproduction subcode is previously detected and the read-in area is formed and then the frame data D1 set to a predetermined value in accordance with the detected timing is recording in accordance with the audio format and succeedingly the record of the reproduction data D1, error correction code and subcode Q is started, and thus a replicate can be made so that the frame data D1 and the like are continued.

According to the present invention, since main data continued in the format of audio data is recorded by using a reproduction subcode as a reference, a disc replication apparatus capable of simply making a replicate and the like of a compact disk or a CD-ROM can be obtained.

At this time, since the main data is recorded by using the reproduction subcode as the reference while keeping a lag between the subcode and frame data and further a read-in area is separately Generated and then replication is made by forming a predetermined pose section so that the frame data and the like are continued, a disc replication in accordance with the standard of a compact disk can be obtained.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 9 is a schematic view explaining the start of record of an audio track;

FIG. 10 is a schematic view explaining the start of record of a data track;

DETAILED DESCRIPTION OF THE EMBODIMENT

Preferred embodiments of this invention will be described with reference to the accompanying drawings:

(1) Overall Processing

Figure 1:
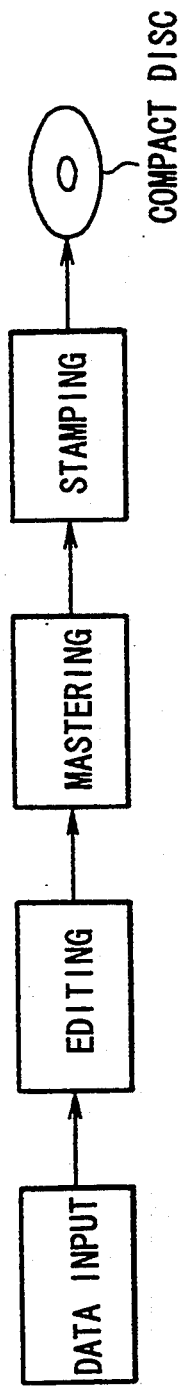
FIG. 1 is a block diagram showing a compact disk making process.
Figure 8:
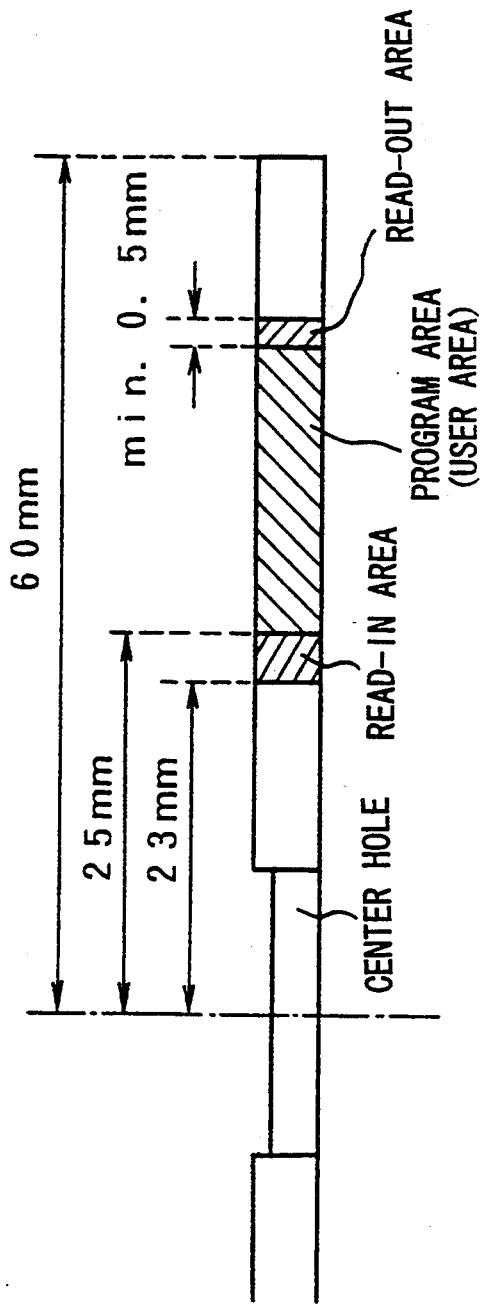
FIG. 8 is a schematic view explaining the standard of a compact disk.
Figure 2:
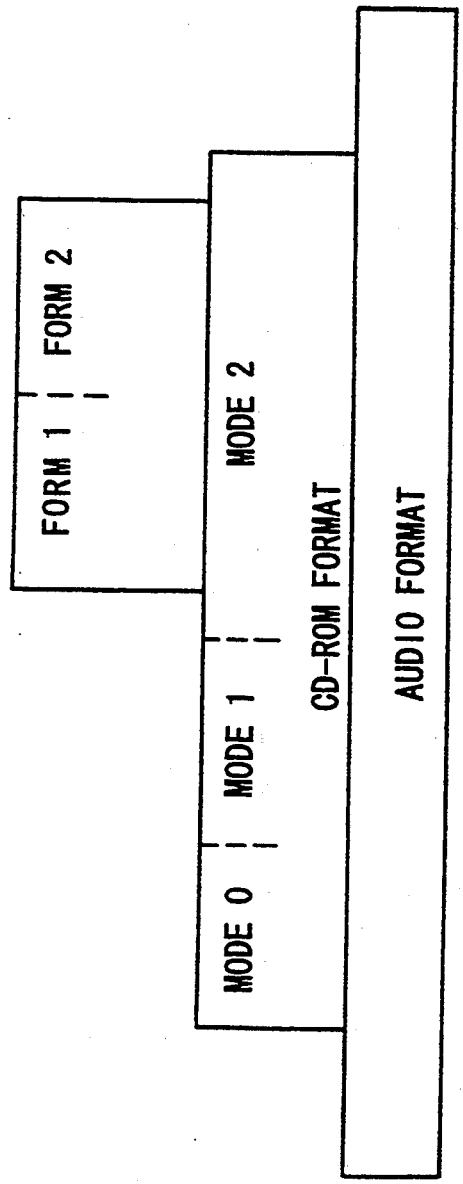
FIG. 2 is a schematic view showing the format of main data.
Figure 3:
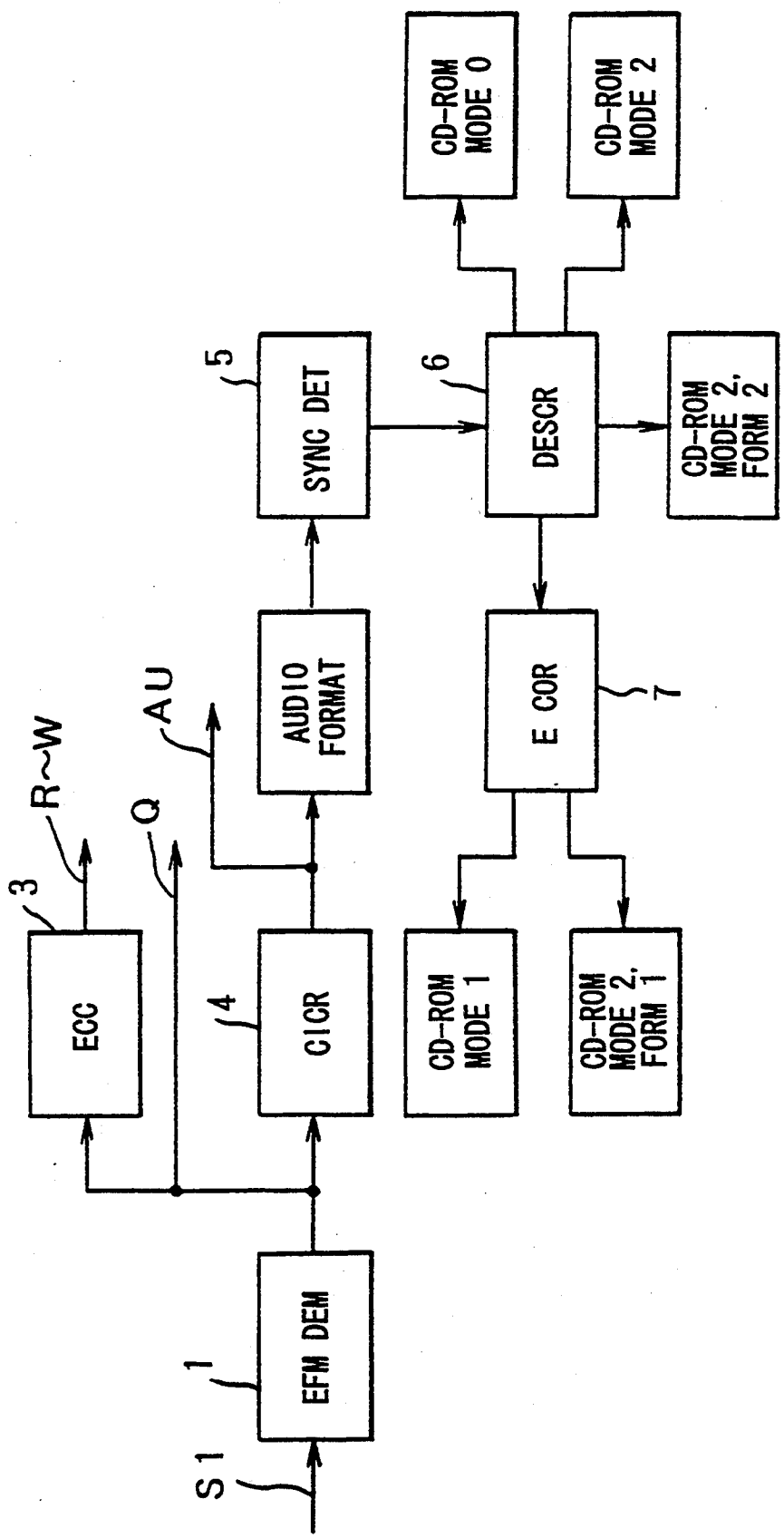
FIG. 3 is a block diagram showing a decoding method of each format.
Figure 4:
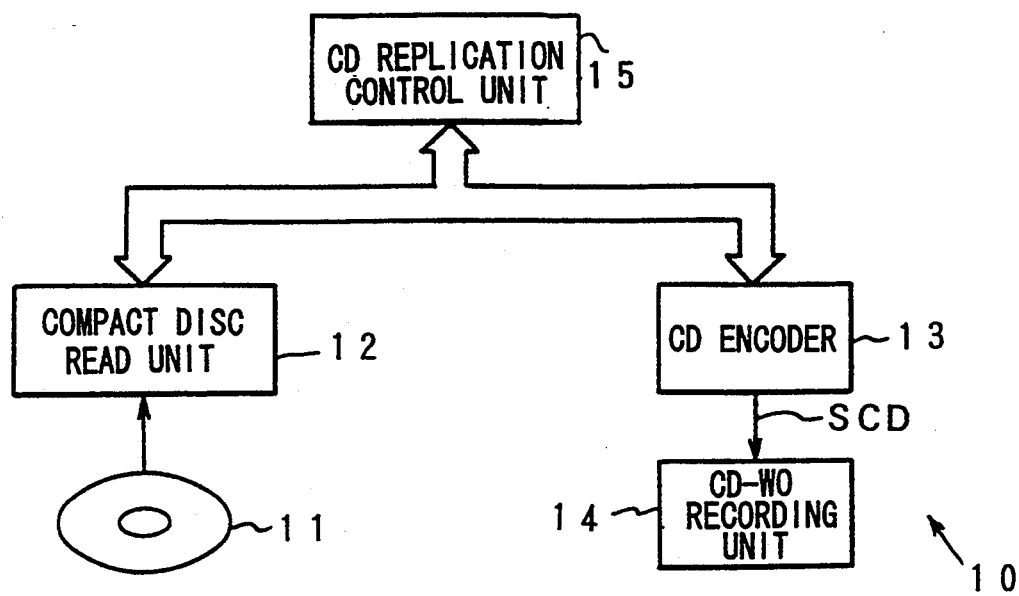
FIG. 4 is a block diagram showing a compact disk replication apparatus of an embodiment according to the present invention.

In FIG. 4, 10 designates a compact disk replication apparatus as a whole in which a compact disk read unit 12 reproduces an original compact disk or a CD-ROM 11 and a resulting reproduced data is converted into a CD signal SCD by a CD encoder 13.

A CD-WO recording unit 14 drives a laser beam source based on the CD signal SCD to sequentially record reproduction data to a write once disc or recording original disk.

A CD replication control unit 15 controls operation as a whole so that the compact disk replication apparatus 10 can make the replicate or master disk of the compact disk 11 at a real time.

(2) Main Data Processing

Figure 5:
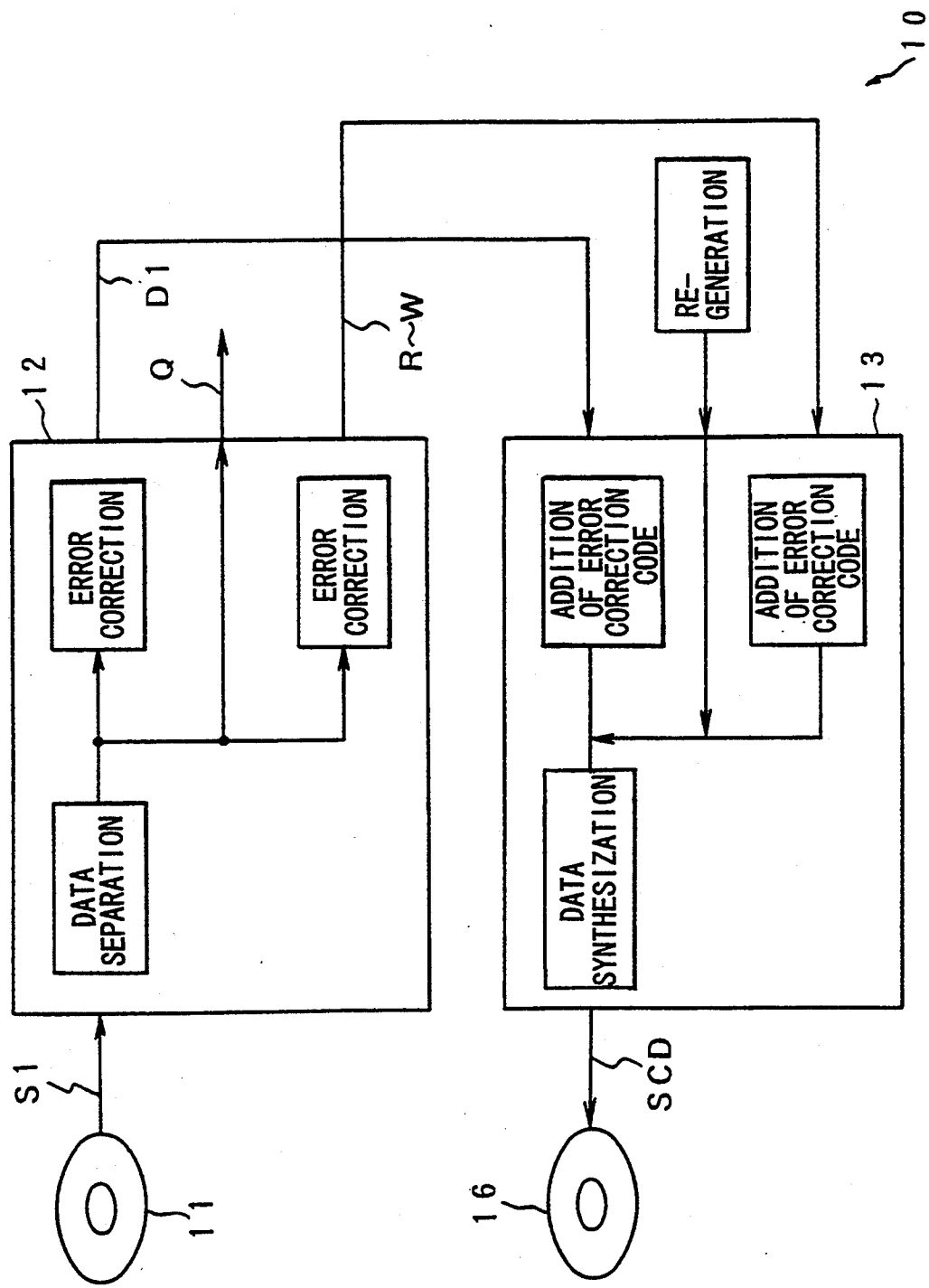
FIG. 5 is a block diagram explaining the outline of the processing effected by the compact disk replication apparatus.

Referring to FIG. 5, the compact disk replication apparatus 10 demodulates an EFM signal S1 obtained from the original compact disk 11 and then separately processes a channel of a subcode Q, a channel of subcode R-W and main data D1.

The main data D1 is composed of frame data and audio data and the compact disk read unit 12 corrects the error of the main data D1 and outputs the same in the format of the audio data.

In correspondence to it, the CD encoder 13 adds an error correction code to the main data D1 and synthesized data to generate the CD signal SCD.

With this arrangement, the compact disk replication apparatus 10 can sequentially convert the frame data and audio data into the CD signal SCD and processes them at a real time, which permits a replicate 16 to be made easily.

At this time, the compact disk replication apparatus 10 can effectively avoid the accumulation of errors by correcting once the error of the frame data and audio data by the format of the audio data, which permits the replicate 16 to be made more securely.

On the other hand, the compact disk read unit 10 corrects the error of the channel of the subcode R-W in accordance with an error correction code added to the channel of the subcode R-W and outputs the same. The CD encoder 13 synthesizes data by adding the error correction code to the channel of the subcode R-W corresponding to the above.

With this arrangement, the compact disk replication apparatus 10 can process the channel of the subcode R-W at a real rime in the same way as the frame data and audio data, and further effectively avoid the accumulation of errors by correcting errors once, which permits the duplicate 16 to be simply and securely made.

On the other hand, when the leading head of the main data D1 is the frame data, the compact disk replication apparatus 10 detects the timing of the channel of the subcode Q with respect to the frame data and outputs the detected result to the CD encoder 13.

The CD encoder 13 separately recreates the channel of the subcode Q based on the detected result of the timing and synthesizes the data of the re-generated channel of the subcode Q to create the CD signal SCD.

More specifically, in the channel of the subcode Q, if the replicate 16 is made by directly using the regenerated channel of the subcode Q, errors are accumulated because no error correction code is added.

Consequently, in the present embodiment, a channel o a correct subcode Q can be reproduced also with respect to the replicate 16 by re-generating only the channel of the subcode Q on the CD encoder 13 side.

At this time, when the leading head of the main data D1 is the frame data, the compact disk replication apparatus 10 detects the timing of the channel of the subcode R-W with respect to the frame data and records the channel of the subcode Q based on the detected result, and thus the replicate 16 can be made while the positional relationship between the frame data and the channel of the subcode Q recorded to the original CD-ROM 11 as it is, which permits the compact disk or the CD-ROM 11 to be replicated correctly.

Further, since the main data D1 is continuously processed in the format of the audio data to the channel of the subcode Q, even if the audio data and frame data mixedly exist as the main data, the original can be exactly replicated with respect to the positional relationship of the channel of the subcode Q to the frame data.

Figure 6:
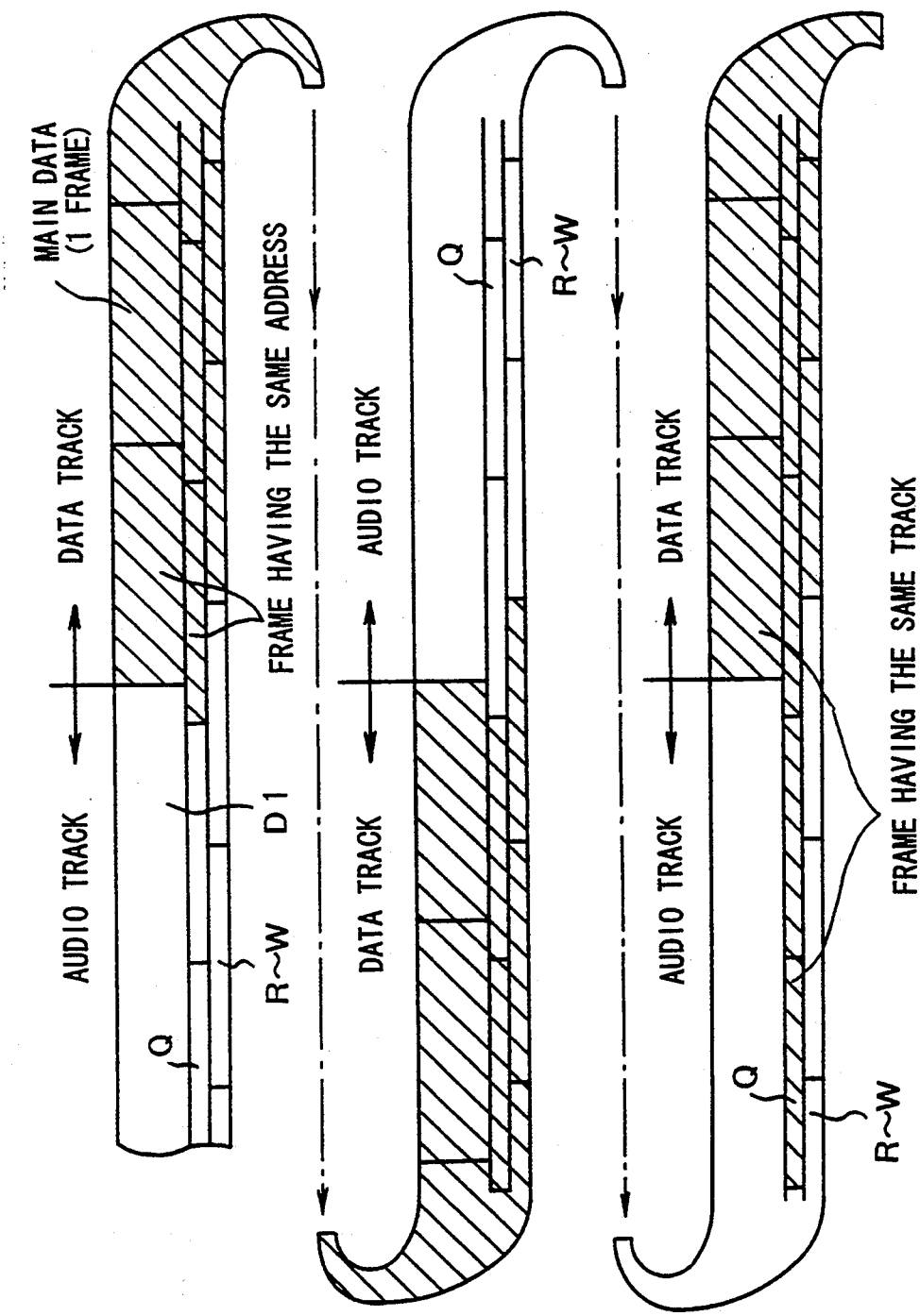
FIG. 6 is a schematic view explaining the data arrangement of a CD-ROM.

More specifically, as shown in FIG. 6, in this type of the CD-ROM, there is the case in which an audio track to which the audio data is assigned as the main data and a data track to which the frame data is assigned as the main data alternately continue.

In this CD-ROM, a decoding method must be changed at the boundary of the audio track and the data track, and thus when a CD signal is to be made after returning it to its original data format once, the audio data and frame data must be discriminated by confirming the content of the main data each time.

Therefore, in this case, continuous main data cannot be processed at a real time.

Further, when the CD signal is generated after returning it to its original data format once, there is a possibility that the positional relationship between the frame data and the channel of the subcode Q to which the same address is recorded may be disturbed.

Figure 7:
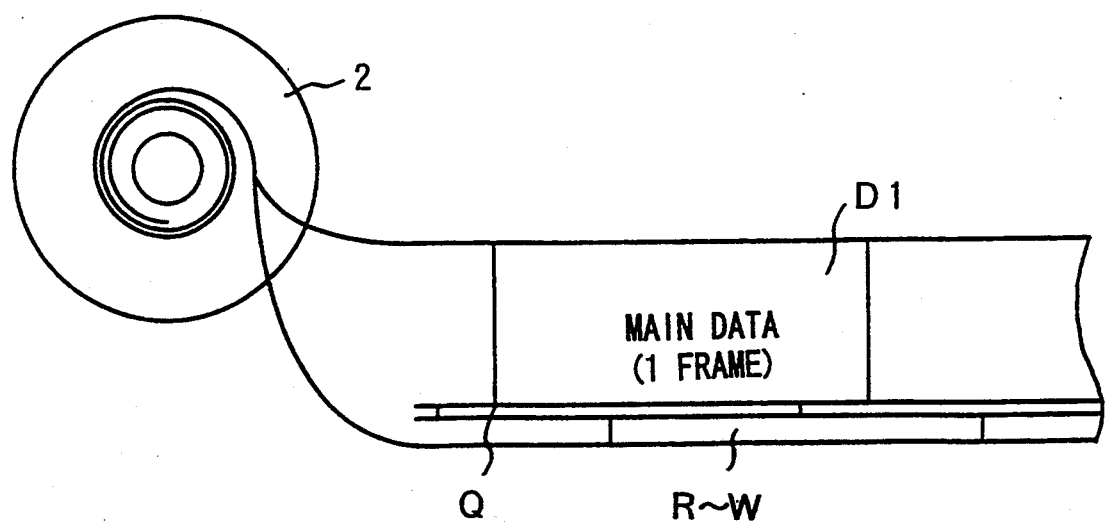
FIG. 7 is a schematic view showing the relationship between main data and a channel of a subcode Q.

Further, as shown in FIG. 7, in the CD-ROM 11, the positional relationship between the channel of the subcode Q and the boundary of the frame data to which the same address as that of the channel of the subcode Q is assigned is different to each CD-ROM 11, and thus when the CD signal is generated after retuning it to its original data format once, it is difficult to exactly replicate this positional relationship as it is.

When the main data D1 is processed in the audio data format as in this embodiment, however, the main data D1 can be continuously processed at a real time and further the positional relationship to the channel of the subcode Q can be kept to the positional relationship of the original by sequentially generating the channel of the subcode R-W by using a previously detected timing as a reference, which permits the original to be exactly replicated as it is.

Further, in this embodiment, the compact disk replication apparatus 10 reproduces data necessary to generate the channel of the subcode Q from the recording area formed to the outermost circumference of the original compact disk or the CD-ROM 11 or outside the read-out area thereof by the compact disk read unit 12, and the CD encoder 13 re-generates the channel of the subcode Q based on the reproduced data.

More specifically, the original compact disk or the CD-ROM 11 includes a compact disk making information repeatedly recorded to the recording area of the outermost circumference predetermined times. Thus, the reproduction of this information permits to reproduce disk information such as the generator and author of the CD-ROM 11, the date when the CD-ROM 11 is made and like, and format information such as time information regarding the flags of a channel of a subcode P, track discrimination data regarding the channel of the subcode Q, format information, index information, time information and the like.

With this arrangement, in the compact disk replication apparatus 10, all the information necessary to make the stamper of the compact disk or the CD-ROM 11 can be obtained only by recording the compact disk making information in a software house. As a result, the information necessary for making the original of the compact disk or the CD-ROM and its master disk can be unitarily managed, which permits a replicate or the master disk 16 to be easily and securely made.

(3) Read-in Area Processing

Incidentally, as shown in FIG. 7, in the compact disk or the CD-ROM, the size of the read-in area is determined by the length in the radial direction of the disk and the length is selected from 46 to 50 [mm] according to a standard.

On the other hand, when the replicate of the compact disk or CD-ROM is made, a case is contemplated in which recording is effected by changing a rotating speed with respect to that of the original 11 within the standard, and in this case, if the read-in area of the original 11 is exactly replicated as it is, there is a possibility that the standard may be deviated.

Further, the same situation may arise with respect to a read-out area because only the length in a radial direction is determined in the same way.

Therefore, the compact disk replication apparatus 10 of this embodiment generates the read-in area and read-out area on the CD encoder 13 side by effecting re-encode with the insertion of null data, and thus the data of the read-in area and read-out area is recorded with a length corresponding to the rotating speed and recording track forming speed of the replicate. As a result, even if the driving conditions of the replicate are different from those of the original, a replicate conforming to the standard can be made.

In this connection, according to the regulation of the standard of the compact disk, actual data must not be recorded to the read-in area and read-out area, and further a usual compact disk player cannot access the read-in area and read-out area. Therefore, even if the read-in area and read-out area are formed by inserting the null data as in this embodiment, a practically sufficiently usable replicate can be made.

(4) Replication Start Position

After the generation of the read-in area as described above, the compact disk replication apparatus 10 generates the frame data by assigning the null data when the main data succeeding to the read-in area is the frame data, records the frame data for a predetermined period (up to 74 frames per second) and then records the reproduction data of the original.

On the other hand, when the main data succeeding to the read-in area is the audio data, the compact disk replication apparatus 10 generates the CD signal SCD by generating the audio data composed of the null data to thereby generate the state of mute for a predetermined period.

Actually, in the compact disk or the CD-ROM, at least 2 seconds from the read-in area is regulated as a pose section, and in the compact disk duplication apparatus 10, the necessary CD signal SCD is generated on the side of the CD encoder 13 so that this standard is satisfied and this CD signal SCD is recorded.

Further, after the formation of the pose section, the compact disk replication apparatus 10 starts to record the reproduction data from the 2 seconds 0 frame of the original.

More specifically, since at least 2 seconds from the read-in area is regulated as the pose section, necessary data can be securely replicated by starting the record of the reproduction data from the 2 seconds 0 frame of the original.

Actually, in the compact disk, the pose section may not be formed in strict conformity to the standard of the compact disk, and such a compact disk may not correctly detect the record start position of the frame data to be continuously recorded.

When the record of the reproduction data is started from the 2 seconds 0 frame as in the present embodiment, however, necessary data can be securely duplicated even in this compact disk.

Therefore, as shown in FIG. 9, the compact disk replication apparatus 10 starts to read out an audio track by triggering the leading head of the channel of the subcode Q of the 2 seconds 0 frame with respect to the original to which the audio track is formed succeeding to the pose section and sequentially replicates the main data and the channel of the subcode R-W which are continued.

At this time, the compact disk replication apparatus 10 corrects the timing of the main data and the channel of the subcode R-W by the CD encoder 13 as well as corrects the timing at which the channel of the subcode Q is generated so that time lags between the channel of the subcode Q, main data and the channel of the subcode R-W which are produced from the time of reproduction to the time of recording occurred in the entire apparatus are corrected.

With this arrangement, the compact disk replication apparatus 10 keeps the same positional relationship of the channel of the subcode Q as that of the original with respect to the main data and the channel of the subcode R-W to be continuously replicated, which permits a replicate to be simply and securely made.

On the other hand, as shown in FIG. 10, in the original having a data track continued from the pose section, the compact disk replication apparatus 10 must start replication from the leading head of the frame data of the 2 seconds 0 frame.

Further, at this time, this type of the CD-ROM must start replication so that the frame data is continuous to the channel of the subcode Q between the pose section and them. Further, in this case, replication must be started so that an address is continuous between the frame data and the channel of the subcode Q in the pose section.

Therefore, in this embodiment, a lag between the channel of the subcode Q and the frame data corresponding to the subcode is detected in such a manner that when the compact disk read unit 12 detects a kind of the main data succeeding to the read-in region, it sequentially reads the addresses of the channel of the subcode Q and frame data in advance, and the timings of the main data, the channel of the subcode R-W and subcode Q channel are further corrected by the amount of the lag as compared with the case in which replication is started from the audio track.

Further, even in the case in which the pose section is generated by recording the frame data and the channel of the subcode R-W by using the null data, the timing of the generating is corrected by the amount of the lag, and thus the replication is started so that the frame data and the channel of the subcode Q are continuous between the pose section and them and an address is also continuous.

With this arrangement, the main data is sequentially replicated while keeping the timing at which the replication is started and the channel of the subcode Q is re-generated, and thus a duplicate having a positional relationship kept similarly to that of the original can be made.

(5) Compact Disk Reading Unit

Figure 11:
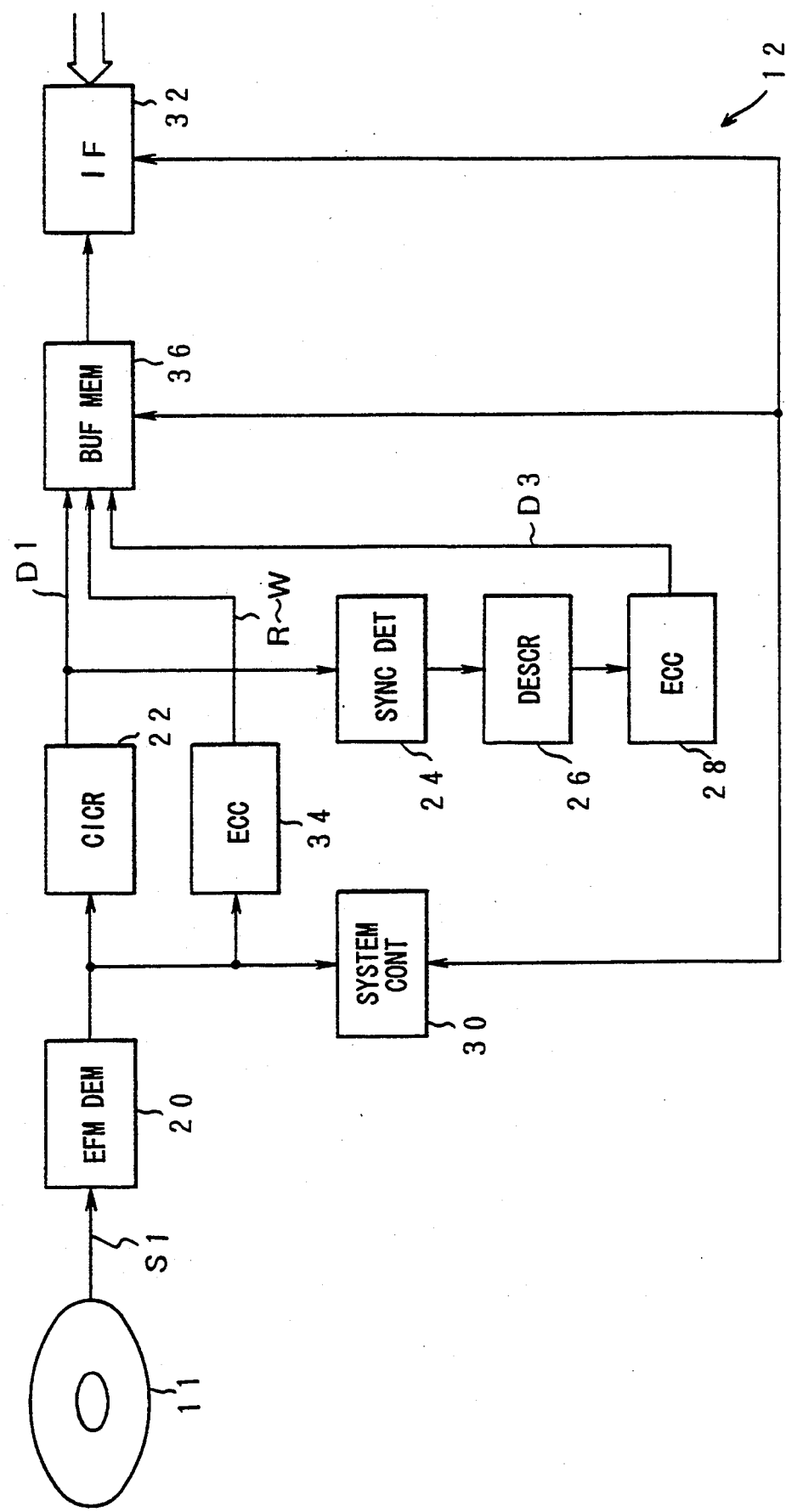
FIG. 11 is a block diagram showing a compact disk read unit.

As shown in FIG. 11, the compact disk reading unit 12 changes operation in accordance with control data output from the CD replication control unit 15 and demodulates the reproduction signal S1 output from an optical pick-up by an EFM demodulation circuit 20 in reproduction.

An error correction circuit 22 executes an error correction processing to the main data by using a cyclic code by fetching data output from the EFM demodulation circuit 22 at a predetermined timing to thereby output the main data D1 in the format of the audio data.

On the other hand, a synchronization detection circuit 24 sequentially cuts out the frame data by detecting the sync bit of the main data D1 and subjects the same to a descramble processing in a next descramble circuit 26 in a frame data unit.

An error correction circuit 28 processes the error of the frame data by using the cyclic code assigned to each frame data to thereby reproduce compact disk making information D3 recorded outside the read-out area.

With this arrangement, the compact disk read unit 12 reproduces the compact disk making information D3 by previously reproducing the outside of a read-out area, and thus the compact disk read unit 12 outputs the compact disk making information D3 to the CD replication control unit 15.

A system controller 30 receives the control data output from the CD replication control unit 15 through an interface circuit 32 to thereby change the operation of the compact disk read unit 12 as a whole.

Further, the system controller 30 detects the data of the channel of the subcode Q by fetching data output from the EFM demodulation circuit 20 and detects its address data.

Further, the system controller 30 detects a timing at which the sync bit of the corresponding frame data is detected by the synchronization detection circuit 24 by using the detected address data as a reference to thereby detect a time lag between the channel of the subcode Q and the frame data corresponding to it.

With this arrangement, the compact disk read unit 12 previously detects the time lag between the channel of the subcode Q and the frame data corresponding to it based on the result detected by the synchronization detection circuit 24 with respect to the frame data succeeding to the read-in region and outputs the detected result to the CD replication control unit 15.

An error detection circuit 34 fetches data output from the EFM demodulation circuit 20 at a predetermined timing in the same way and executes an error correction processing to thereby reproduce and output the channel of the subcode R-W.

A buffer memory 36 accumulates the main data and the channel of the subcode R-W once and sequentially outputs them.

Therefore, the thus reproduced main data D1 and the channel of the subcode R-W are output to the CD encoder 13 through a bus common to the control data and the interface circuit 32.

(6) CD Encoder

Figure 12:
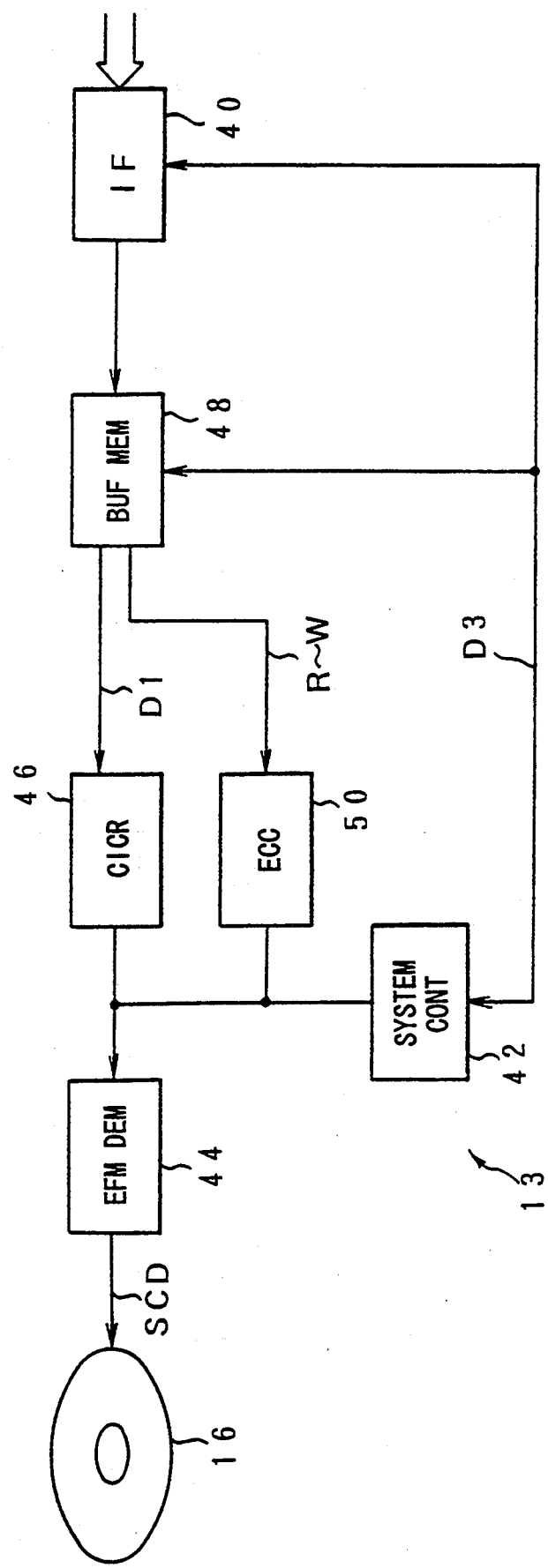
FIG. 12 is a block diagram showing a CD encoder.

As shown in FIG. 12, in the CD encoder 13, the control data supplied from the CD replication control unit 15 through an interface circuit 40 is input to a system controller 42 to control the operation of the CD encoder 13 as a whole.

More specifically, in the CD encoder 13, the CD-WO recording unit 14 is put into operation in accordance with the control data from the CD replication control unit 15 and the replicate 16 is rotated under predetermined driving conditions.

Further, the CD encoder 13 forms the read-in area to the innermost circumference of the replicate 16 in this state and then forms the pose section in accordance with the timing information output from the CD replication control unit 15 based on the result detected by the compact disk reading unit 12.

Further, in the CD encoder 13, the system controller 42 sequentially generates the channel of the subcode Q in accordance with the compact disk making information D3 input through the interface circuit 40 and an EFM modulation circuit 44 converts the same into the CD signal SCD.

On the other hand, an error correction circuit 46 generates an error correction code composed of a cyclic code with respect to the main data D1 sequentially input from the interface circuit 40 through a buffer memory 48 and outputs the error correction code and main data D1 to the EFM modulation circuit 44, whereas an error correction circuit 50 adds an error correction code to the channel of the subcode R-W and outputs the same to the EFM modulation circuit 44.

With this arrangement, in the CD encoder 13, the main data D1, the channel of the subcode R-W and subcode Q can be sequentially converted into the CD signal SCD in accordance with the control data from the CD replication control unit 15 and the CD signal SCD is output to the CD-WO recording unit 14 and recorded to the replicate 16.

At this time, in the buffer memory 48, the output timings of the main data and the channel of the subcode R-W are delayed by the delay time set through the system controller 42 and output at this time, and thus in the compact disk replication apparatus 10, the main data and the like can be recorded by the same positional relationship as that of the original 11 by setting the delay time through the CD replication control unit, and thus the original 11 can be correctly replicated.

(7) CD Replication Control Unit

Figure 13:
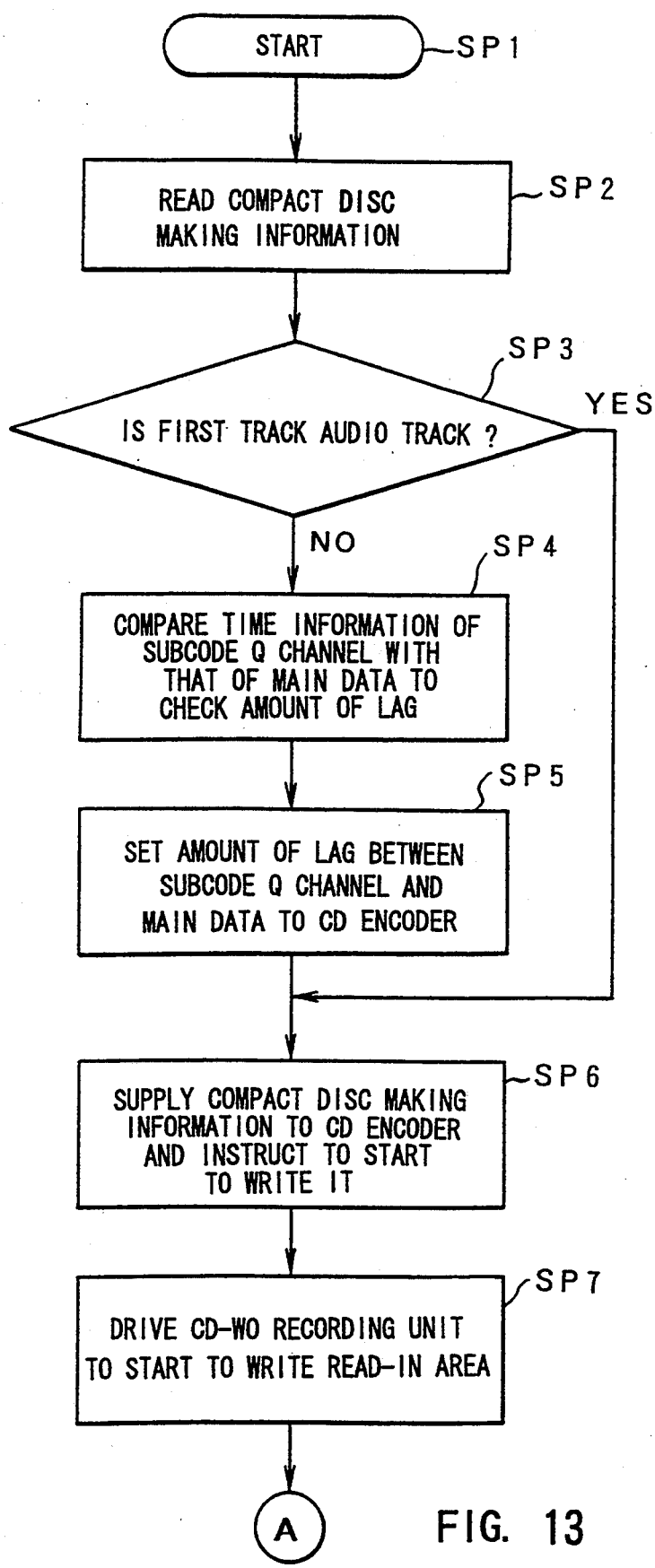
FIGS. 13 to 15 are flowcharts showing a duplication processing procedure.

The CD replication control unit 15 is composed of an arithmetic processing unit. When the original 11 and the object to be replicated 16 are loaded to the compact disk read unit 12 and CD-WO recording unit 14, respectively and the a replication start switch is depressed, the CD replication control unit 15 executes a processing procedure shown in FIGS. 13 to 15 and starts a replication processing.

Here, the CD replication control unit 15 proceeds to step SP2 from step SP1 and supplies the control data to the compact disk read unit 12 to reproduce the compact disk making information D3 recorded to the outermost circumference of the original.

When the compact disk making information D3 is read, if it is not recorded to the original 11, the CD replication control unit 15 separately displays a message on a display unit to prompt the input of the compact disk making information. When an operator inputs the compact disk making information through a floppy disk or the like, the CD replication control unit 15 proceeds to step SP3 next.

Here, the CD replication control unit 15 determines whether or not the main data recorded at the leading head of the original is the audio data based on the compact disk making information D3, and if a negative result is obtained here, the CD replication control unit 15 proceeds to step SP4.

Here, the CD replication control unit 15 outputs the control data to the compact disk read unit 12 and starts reproduction from the read-in area to sequentially detect the time information of the channel of the subcode Q and main data.

With this operation, the CD replication control unit 15 detects the channel of the subcode Q and the frame data corresponding to it based on the absolute time information recorded to the channel of the subcode Q and main data to thereby detect a time lag between the channel of the subcode Q and the frame data.

Next, the CD replication control unit 15 proceeds to step SP5 and outputs the control data to the CD encoder 13 To set a delay time of the buffer memory 40.

With this operation, the CD replication control unit 15 sets the time lag between the channel of the subcode Q and the frame data to the CD encoder 13, and then the main data and the channel of the subcode Q can be recorded while keeping the positional relationship of the original 11, and the CD replication control unit 15 proceeds to step SP6.

On the other hand, when an affirmative result is obtained at step 3, the CD replication control unit 15 goes directly to step SP6 and supplies the compact disk making information D3 to the CD encoder 13 and succeedingly supplies a replication start command to the CD encoder 13.

In correspondence to this operation, the CD encoder 13 drives the CD-WO recording unit 14 at step SP7 and then forms the read-in area with reference to the compact disk making information D3.

At this time, when the leading head of the original 11 is the frame data, the CD encoder 13 forms the read-in area by sequentially synthesizing the main data, data of the channel of the subcode Q and the like while delaying them by a preset delay time.

Note, at this time, the CD encoder 13 also synthesizes the channel of the subcode P while delaying it for the preset delay time in the same way to generate the CD signal SCD.

Figure 14:
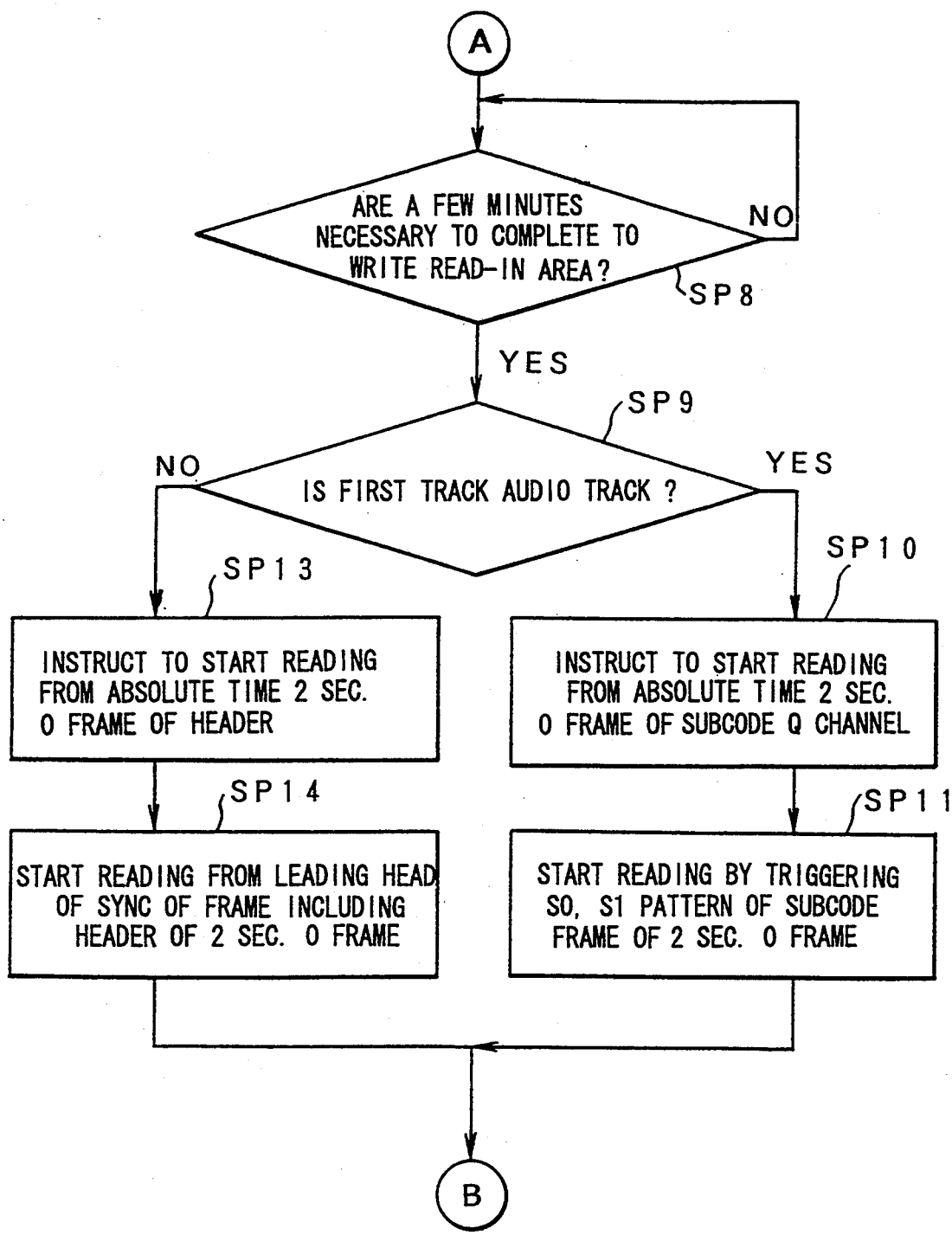

When the formation of the read-in area is started as described above, the CD replication control unit 15 proceeds to step SP8 next as shown in FIG. 14 and monitors the operation of the CD-WO recording unit 14 to determine whether or not a few seconds are further necessary to terminate the formation of the read-in area. When a negative result is obtained here, the CD replication control unit 15 repeats step SP8.

With this operation, the CD replication control unit 15 repeats step SP8 until the time at which a few seconds are necessary to terminate the formation of the read-in area and then proceeds to step SP9.

Here, the CD replication control unit 15 determines whether or not the first main data of the original 11 is the audio track based on the compact disk making information D3. When an affirmative result is obtained here, the CD replication control unit 15 goes to step SP10 and instructs the compact disk read unit 12 to start to read the audio track from the channel of the subcode Q of the 2 seconds 0 frame.

In correspondence to this operation, the compact disk read unit 12 triggers the S0 and S1 pattern of the subcode frame of the 2 seconds 0 frame (i.e., composed of the leading head of the channel of the subcode Q) at next step SP11 to start to read the audio track.

Figure 15:
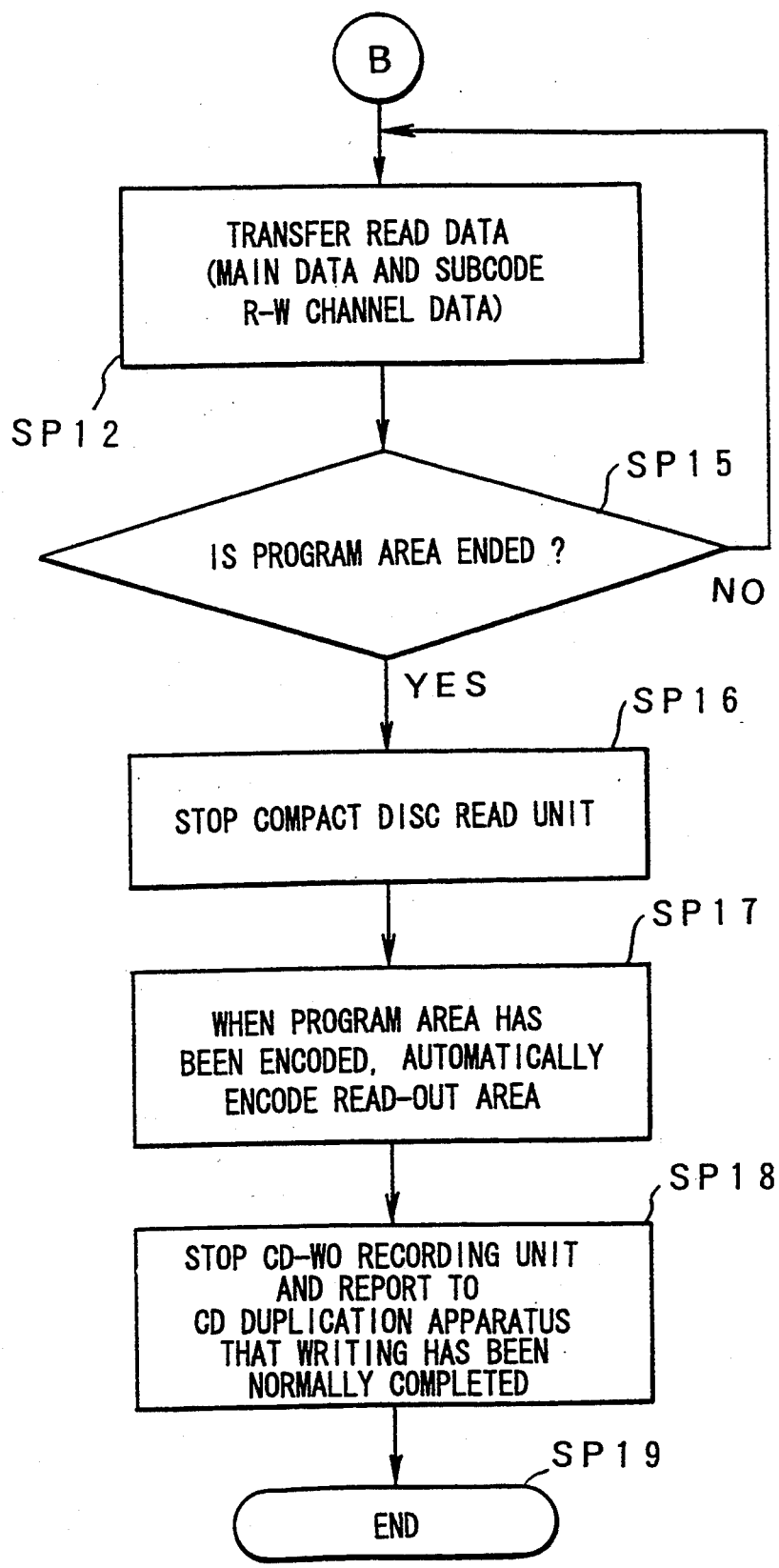

With this operation, the compact disk replication apparatus 10 starts to read the audio track from the 2 seconds 0 frame, and thus it can sequentially replicate the main data and the channel of the subcode R-W which are continued and then the CD duplication control unit 15 goes to step SP12 as shown in FIG. 15.

On the other hand, when the first main data is the data track, a negative result is obtained at step SP9, and thus the CD replication control unit 15 goes to step SP13 and outputs the control data to the compact disk read unit 12 so that reading is started form the 2 seconds 0 frame by using a header added with the frame data as a reference.

In correspondence to this operation, the compact disk read unit 12 starts the reading from the 2 seconds 0 frame by using the header added with the frame data as the reference and then the CD replication control unit 15 goes to step SP12.

At step SP12, the CD replication control unit 15 transfers the main data and the channel of the subcode R-W data sequentially output from the compact disk read unit 12 to the CD encoder 13, which accumulates the transferred data in the buffer memory 40 in the period during which the pose section is formed from a 0 second 0 frame to 1 second 74 frames.

With this operation, the compact disk replication apparatus 10 accumulates the read data once until the formation of the pose section is completed on the replicate 16 side and then can record the same at sequentially set timings.

Next, the CD replication control unit 15 goes to step SP15 to determine whether or not the program area of the original has been read. When a negative result is obtained here, the CD replication control unit 15 repeats the processing loop of steps SP12 to SP15.

With this operation, the compact disk replication apparatus 12 records the sequentially read data to the replicate 16, and when the program area has been recorded and an affirmative result is obtained at step SP15, the CD replication control unit 15 goes to step SP16.

Here, the CD replication control unit 15 stops the compact disk read unit 12 and sends disk data of end to the CD encoder 13 at next step SP17.

In correspondence to this operation, on the completion of the record of the program area, the CD encoder 13 generates the CD signal SCD with respect to the read-out area, and on the completion of the formation of the read-out area, the CD replication control unit 15 stops the CD-WO recording unit 14 at next step SP18.

Further, when the recording operation is normally completed at this time, the CD encoder 13 sends the data of this fact to the CD replication control unit 15, which goes to step SP19 on receiving this data and terminates this procedure.

(8) Advantage of the Embodiment

According to the above arrangement, a replicate and the like of a compact disk or a CD-ROM can be made at a real time by recording continuous main data in the format of audio data.

At this time, the replicate can be correctly made by recording the main data so that a lag between a previously detected channel of the subcode Q and frame data is kept, and further the replicate can be properly made in such a manner that a read-in area is made by forming a predetermined pose section so that frame data and the like are continued.

With this arrangement, the replicate can be simply and correctly made.

(9) Other Embodiments

Note, although the aforesaid embodiment describes the case in which a replicate or a master disk are made in accordance with the compact disk making information recorded to an original, the present invention is not limited thereto, but when the compact disk making information is supplied by a floppy disk or the like, the master disk can be also made from a usual compact disk.

Further, although the aforesaid embodiment describes the case in which a replicate is made at a real time, the present invention is not limited thereto but applicable to the case in which the rotating speed of an original is increased to make a replicate at, for example, a double speed.

Further, although the aforesaid embodiment describes the case in which a replicate is made by driving a single set of a CD-WO recording unit, the present invention is not limited thereto, but a plurality of replicates may be made at the same time by connecting a plurality of CD-WO recording units.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A disk replication apparatus, comprising:
   a reproduction unit for reproducing an original optical disk and sequentially outputting reproduced data, the original optical disc including a program region;
   a recording signal generation unit for sequentially converting said reproduced data into a recording signal;
   a control unit for controlling said reproduction unit and said recording signal generation unit;
   the reproducing unit having an EFM demodulator for demodulating a reproduction signal obtained from the program region of the original optical disk and for producing a reproduction subcode and main data; and
   an error correction means for generating a reproduction data by correcting the error of the main data;
   said recording signal generation unit including a subcode generation means, a correction code generation means, and an EFM modulation means, the subcode generation means generating a subcode in accordance with subcode generation data input through a predetermined input means by using a timing of the reproduction subcode as a reference, the timing of the reproduction being generated by the recording signal generation unit, the correction code generation means generating an error correction code of the reproduction data, and the EFM modulation means synthesizing the reproduction data, the error correction code of the reproduction data and the subcode and EFM modulating the reproduction data, the error correction code of the reproduction data and the subcode to generate the recording signal.

2. A disk replication apparatus, comprising:
   a reproduction unit for reproducing an original optical disk and sequentially outputting reproduced data, the original optical disc including a program region;
   a recording signal generation unit for sequentially converting said reproduced data into a recording signal;
   a control unit for controlling said reproduction unit and said recording signal generation unit;
   said original optical disk being recorded with user data in accordance with an audio format so that the user data is subject to a scramble processing in a predetermined block unit and added with sync data to generate frame data and the frame data is sequentially added with an error correction data and a subcode and recorded;
   said reproduction unit includes a demodulation means for outputting a reproduction subcode, the frame data and the error correction data by EFM demodulating a reproduction signal obtainable from the program region of said original optical disk, the reproduction unit also including an error correction means for generating reproduction data by correcting the error of the frame data and sequentially outputting the user data in the format of audio data reproduced in the audio format by outputting the reproduction data in a format of the frame data; and
   said recording signal generation means including a correction code generation means and an EFM modulation means, the correction code generation means sequentially generating a correction code to the reproduction data, the EFM modulation means synthesizing the reproduction data, the error correction code and the subcode and then EFM modulating the reproduction data, the error correction code and the subcode to generate the recording signal, the EFM modulation means sequentially generating in accordance with the audio format the recording signal from the reproduction data output from said reproduction unit in the format of the frame data.

3. A disk replication apparatus according to claim 2, wherein:
   said recording signal generation unit records the reproduction data, the error correction code and the subcode to said object to be replicated as a disk by driving said object to be replicated as a disk under predetermined conditions and irradiating a laser beam modulated by the recording signal to said object to be replicated as a disk; and
   said recording signal generation unit forms a read-in area on an inner circumference side of said object to be replicated as a disk in accordance with the predetermined conditions for driving said object to be replicated as a disk, said read-in area having a predetermined length in a radial direction of said disk, and then records the reproduction data, the error correction code and the subcode.

4. A disk replication apparatus according to claim 2, wherein:
   said original optical disk records audio data in addition to the frame data;
   said reproduction unit detecting whether reproduction data continuous to a read-in area is any of the frame data and the audio data with respect to said original optical disk;
   said recording signal generation unit recording the reproduction data, the error correction code and the subcode to said object to be replicated as a disk by driving said object to be replicated as a disk under predetermined conditions and irradiating a laser beam modulated by the recording signal to said object to be replicated as a disk and forms a read-in area on an inner circumference side of said object to be replicated as a disk in accordance with the predetermined conditions for driving said object to be replicated as a disk, said read-in area having a predetermined length in a radial direction of said disk, and then when the reproduction data continuous to the read-in area is the audio data and the channel data of the reproduction subcode reaches a predetermined replication start value, said recording signal generation unit starts recording the reproduction data, the error correction code and the subcode, and when the reproduction data continuous to the read-in area is the frame data, said recording signal generation unit records the reproduction data, the error correction code and the subcode from a leading head of the frame data corresponding to the predetermined replication start value, based on a detected result of said reproduction unit.

5. A disk replication apparatus according to claim 4, wherein:

said reproduction unit detects the timing of the frame data corresponding to the channel data of the reproduction subcode when the reproduction data continuous to said read-in area is the frame data; and said recording signal generation unit forming the read-in area and recording in accordance with the audio format the frame data set to a predetermined value in accordance with a timing and starts to record the reproduction data, the error correction code and the subcode.

* * * * *

UNITED STATES PATENT AND TRADEMARK OFFICE
CERTIFICATE OF CORRECTION

PATENT NO. : 5,414,688
DATED : May 9, 1995
INVENTOR(S) : Inokuchi

It is certified that error appears in the above-indentified patent and that said Letters Patent is hereby corrected as shown below:

On the title page: Item [73] Assignee: Sony Corporation, Tokyo, Japan.

Signed and Sealed this

Twentieth Day of August, 1996

Attest:

BRUCE LEHMAN

*Attesting Officer*     *Commissioner of Patents and Trademarks*